Figure 1:
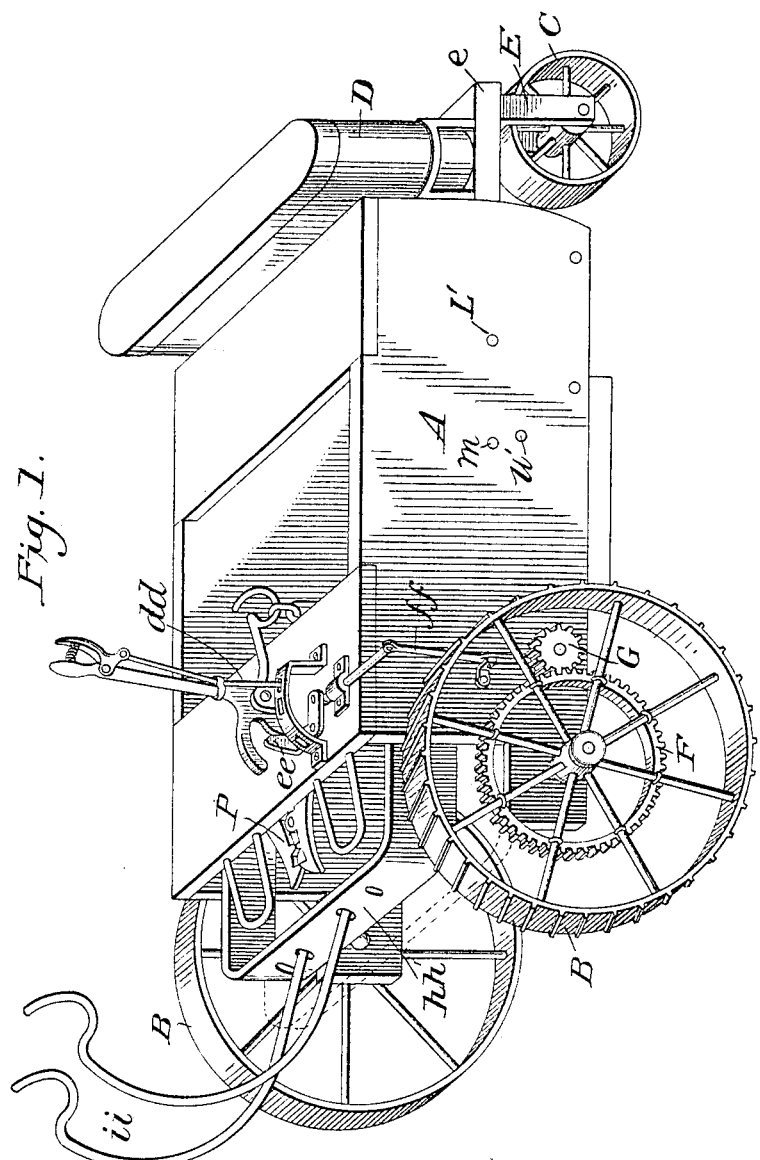

No. 818,586. PATENTED APR. 24, 1906.
A. C. URDAHL.
TOBACCO SELF TRANSPLANTER.
APPLICATION FILED AUG. 18, 1902.

3 SHEETS—SHEET 1.

Witnesses:

Inventor:
Arent Christopher Urdahl

No. 818,586. PATENTED APR. 24, 1906.
A. C. URDAHL.
TOBACCO SELF TRANSPLANTER.
APPLICATION FILED AUG. 18, 1902.
3 SHEETS—SHEET 2.
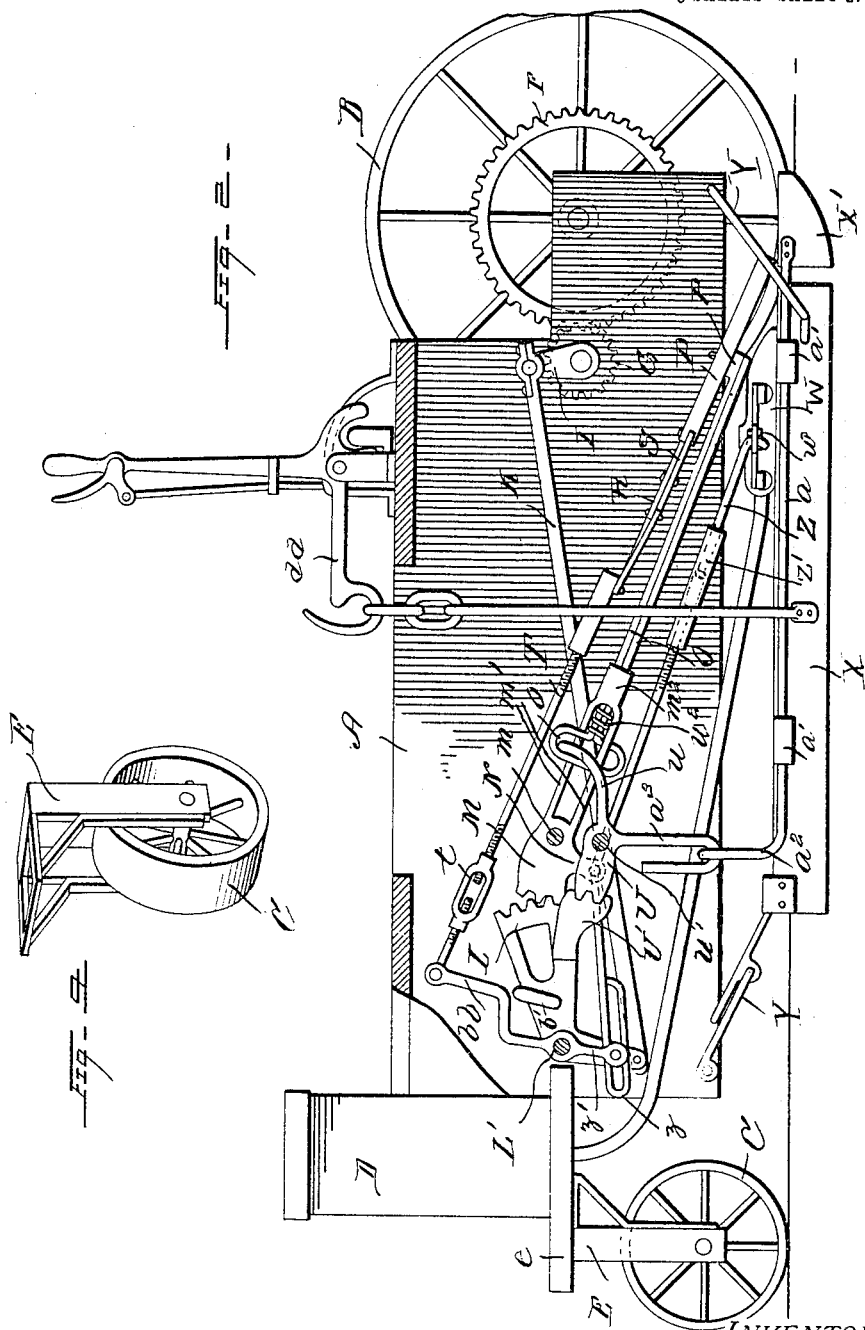
WITNESSES:
INVENTOR
Arent Christopher Urdahl
By
Milo B. Stevens and Co.
Attorneys

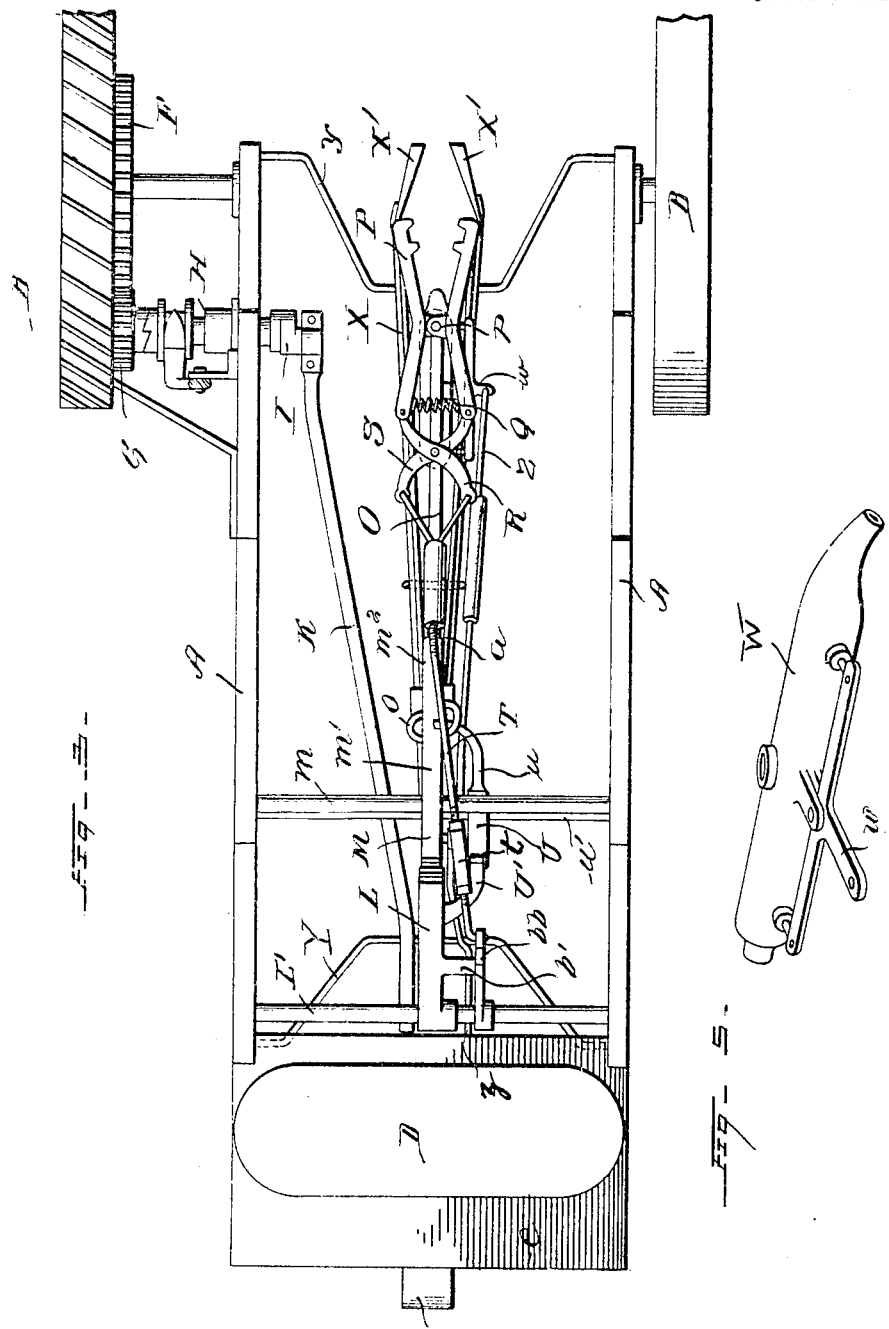

UNITED STATES PATENT OFFICE.

ARENT CHRISTOPHER URDAHL, OF VIROQUA, WISCONSIN.

TOBACCO SELF-TRANSPLANTER.

No. 818,586.

Specification of Letters Patent.

Patented April 24, 1906.

Application filed August 18, 1902. Serial No. 120,068.

*To all whom it may concern:*

Be it known that I, ARENT CHRISTOPHER URDAHL, a citizen of the United States, residing at Viroqua, in the county of Vernon and State of Wisconsin, have invented a new and useful Tobacco Self-Transplanter, of which the following is a specification.

My invention is a transplanter, and has for its object to provide an improved machine which opens a furrow in the ground, then sets the plants properly in the furrow and waters the roots, and then covers and packs the same with earth.

To this end the invention consists in certain novel features of construction hereinafter described and claimed.

In the accompanying drawings, Figure 1 is a perspective view of the machine. Fig. 2 is a side elevation with parts of the frame removed. Fig. 3 is a plan view. Fig. 4 is a detail in perspective of the caster-wheel. Fig. 5 is a similar view of the sprinkler to be herein after described.

Referring specifically to the drawings, A denotes the frame of the machine, which is mounted on wheels B at the rear end and a caster-wheel C in front, the latter being carried in a frame E, swiveled to a platform $e$ at the front end of the machine. This platform also supports a water-tank D.

To the axle of one of the rear wheels B is made fast a spur-wheel F, which meshes with a pinion G on a counter-shaft supported in the frame A. A suitable clutch mechanism H is provided for throwing the shaft in to and out of gear.

At the inner end of the shaft is a crank I, which is joined by a connecting-rod K to a crank-arm on a segment-gear L, supported on a shaft L′, carried by the frame A. The gear L meshes with a similar gear M on a shaft $m$, supported in the frame A. The gear M is formed with a pair of projecting arms $m'$, which are joined at their ends to a tube $m^2$. The supporting-rods O for the plant-holder P, whereby said holder is raised and lowered to receive and set the plants, extend loosely through this tube. Said support comprises two rods of spring metal terminating in a loop or hook $o$ between the arms $m'$.

The plant-holder comprises two jaws, which are pivoted at $p$ to the outer ends of the rods O. A spring Q, between the rear ends of the jaws, assists to close them. The jaws may also be faced with rubber or other suitable material to prevent injury to the plants.

The means for opening and closing the jaws comprise lazy-tongs, the members R and S of which are connected to the rear ends of the jaws and to a rod T, connecting with a rocker $b\ b$, loosely mounted on the shaft L′.

The rod T is provided with a turnbuckle $t$ to enable the proper adjustment to be made. The rocker $b\ b$ extends in to the path of a lug $b'$, projecting from one side of the gear L. When the jaws are in lowered position, this lug strikes the rocker and swings it, and by means of the rod T and the lazy-tongs R and S the jaws are opened to release the plants. The gear M has a depending arm N, which is connected by a looped rod $z$ with an extension $z'$, formed on the rocker $b\ b$. The object of these connections is to open the jaws when they are in elevated position to receive the plants. The jaws are raised and lowered when the gear L is rocked, this motion being communicated to the gear M.

The furrow-opener is indicated at X and is carried by swinging supports Y, secured to the frame A. The furrow-opener carries coverers X′, the latter being fastened to the rear ends of rods $a$, supported in bearings $a'$ on the furrow-opener. The front ends of the rods are formed in to a loop $a^2$, which engages with a hook $a^3$, extending from a segment-gear U, working on a shaft $u'$, supported on the frame A. The gear U is in mesh with teeth U′, formed on the gear L, which teeth are offset, so as not to interfere with the operation of the gear M.

The hook $o$ at the inner ends of the rods O is engaged by an arm $u$, extending laterally from the gear U. A spring $u^2$ is coiled around the rods O between the loop $o$ and the inner end of the tube $m^2$. The purpose of this arrangement will be described hereinafter.

The sprinkler comprises a casing W, carried by the furrow-opener, the nozzle of said sprinkler being directed so that the roots of the plants receive the discharge therefrom as they are set in the furrow. The valve-stem $w$ is actuated by a rod Z, connecting with the arm N, extending from the gear M. The rod is in two sections, one of which screws into a tube Z′ and the other extends loosely into said tube, its end being fitted with a ball or enlargement to prevent withdrawal from the tube. The rod is made telescoping, so that the sprinkler will not be operated until the plants reach the furrow. The sprinkler is connected by a flexible hose with the tank D.

In the operation of the machine a furrow is opened by the opener X as the machine is driven over the field. When the jaws P are in elevated position, they open to receive the plant, which is fed thereto by hand from a suitable tray or other device on the frame A. The jaws then lower, and when the plant reaches the furrow it is released by the opening of the jaws. After the plant is released it is watered, the sprinkler being operated through the rod Z connecting with the arm N. The roots are then covered by earth by means of the coverers X'. These are actuated by the gear U through the connections $a^3$, $a^2$, and $a$, which pull the coverers toward the front of the machine, and thereby cause them to throw earth on the roots.

The rod $z$, connecting the arm N on the gear M and the extension $z'$ of the rocker $b\ b$, opens the jaws when they are in elevated position. When the jaws are in lowered position, they are opened by the stud $b'$ striking the rocker $b\ b$. The rod $z$ is looped, as shown, so that it will not actuate the rocker $b\ b$ until the jaws have come to their proper position.

The object of the connection $u$ with the rods O is to hold the jaws momentarily stationary while the plants are being released, although the machine is in motion. This is done by the arm $u$, which pushes the rods rearwardly a bit at the instant the plants are released.

The means for throwing the machine into and out of gear comprise a hand-lever fulcrumed on a platform at the rear end of the machine and joined by a suitable connection with the clutch H. Suitable means are provided for locking the lever. The lower end of the lever has an extension $d\ d$, formed with a hook which receives a chain or rod connected to the furrow-opener. By means of this connection when the hand-lever is operated to throw the machine out of gear the furrow-opener will be raised above the ground at the same time.

Having thus described my invention, what is claimed as new, and desired to be secured by Letters Patent, is—

1. In a transplanter, the combination of a wheeled frame carrying a furrow opener and closer, vertically-swinging rods carrying jaws to receive the plants, wheel-driven means for raising and lowering the rods, and wheel-driven means for opening the jaws when they are in elevated and in lowered positions respectively.

2. In a transplanter, the combination of a wheeled frame carrying a furrow-opener and an intermittently-operating furrow-closer, vertically-swinging rods carrying jaws to receive the plants, wheel-driven means for opening the jaws to release the plants when said jaws are lowered, and wheel-driven means to actuate the furrow-closer.

3. In a transplanter, the combination of a wheeled frame carrying a furrow opener and closer, a segment-gear carrying rods provided with jaws to receive the plants, a rocker, a wheel-driven segment-gear meshing with the first-mentioned gear to raise and lower the jaws, and a trip carried by the wheel-driven gear and engaging the rocker to open the jaws.

4. In a transplanter, the combination of a wheeled frame carrying the furrow opener and closer, a segment-gear carrying rods provided with jaws to receive the plants, and having a projecting arm, a sprinkler having a controlling-valve connected with the aforesaid arm, wheel-actuated means for opening the jaws, and a wheel-driven segment-gear meshing with the aforesaid gear to raise and lower the jaws and to operate the sprinkler-valve.

5. In a transplanter, the combination of a wheeled frame carrying the furrow opener and closer, a segment-gear carrying rods provided with jaws to receive the plants, said gear having a projecting arm, a wheel-driven segment-gear meshing with the first-mentioned gear to raise and lower the jaws, a rocker, one end of which is operatively connected to the jaws, and the other end is connected to the aforesaid arm, and a trip carried by the wheel-driven gear and engageable with the rocker.

A. CHRISTOPHER URDAHL.

Witnesses:
T. T. SANWICK,
KNUT MOSENG.